United States Patent Office 3,715,395
Patented Feb. 6, 1973

3,715,395
SUBSTITUTED THIOBENZANILIDES
Helmut Mrozik, Matawan, and Dale R. Hoff, Basking Ridge, N.J., assignors to Merck & Co., Inc., Rahway, N.J.
No Drawing. Continuation-in-part of application Ser. No. 656,031, July 26, 1967. This application Sept. 11, 1970, Ser. No. 71,417
Int. Cl. C07c 153/05
U.S. Cl. 260—551 S         1 Claim

ABSTRACT OF THE DISCLOSURE 2-hydroxy thiobenzanilides having an aromatic ring linked to the aniline moiety by oxygen or sulfur are disclosed as are processes for the preparation of novel 2-hydroxy thiobenzanilides from the corresponding salicylanilides. Anthelmintic compositions useful in the treatment of parasitic diseases containing a substituted 2-hydroxy thiobenzanilide as an active ingredient are also disclosed.

RELATED APPLICATIONS

This application is a continuation-in-part of our copending application Ser. No. 656,031, filed July 26, 1967, now abandoned.

BACKGROUND OF THE INVENTION

Field of the invention

The invention relates to a class of chemical compounds which may be described as 2-hydroxy thiobenzanilides. These novel compounds are tricyclic, and each ring may be variously substituted. The aromatic ring which is linked to the aniline moiety via an oxygen or sulfur atom can be linked at a carbon meta or para to the nitrogen of the anilide.

Description of the prior art 2-hydroxy thiobenzanilides as a class of compounds are known in the art, and various methods have been employed for their preparation. The 2-hydroxy thiobenzanilides which are the subject of this invention, however, unlike those known in the prior art, are substituted on the aniline moiety with an aromatic ring which is linked to the aniline moiety via an oxygen or sulfur atom, which aromatic ring may itself be variously substituted. The 2-hydroxy thiobenzanilides of this invention possess significant anthelmintic activity and are particularly effective against liver fluke.

SUMMARY OF THE INVENTION

An object of this invention is to provide novel 2-hydroxy thiobenzanilides. A further object is the provision of methods for synthesizing these novel compounds and of anthelmintic compositions which comprise one or more of the 2-hydroxy thiobenzanilides intimately dispersed in a suitable carrier vehicle. Also within the scope of the present invention are the non-toxic acid or amine addition salts of the thiobenzanilides. In accordance with this invention, it has been found that these 2-hydroxy thiobenzanilides are highly active anthelmintics and are particularly effective against both mature and immature liver fluke of the species *Fasciola gigantica* and *Fasciola hepatica*. In addition, the 2-hydroxy thiobenzanilides have antifungal and antibacterial activity.

DESCRIPTION OF THE PREFERRED EMBODIMENTS

The novel 2-hydroxy thiobenzanilides of the present invention can be structurally depicted as follows:

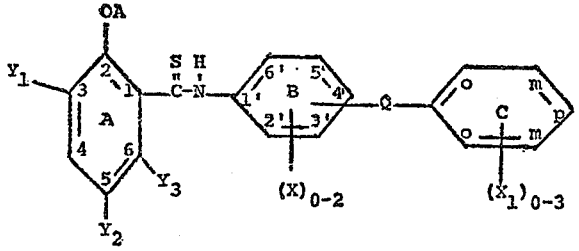

where A is hydrogen or lower alkanoyl such as acetyl, propionyl or butyryl. The lower alkanoyl radical is preferably acetyl. $Y_1$ and $Y_2$ are each halogen or nitro, and $Y_3$ is hydrogen or hydroxy. X and $X_1$ are each halogen or trifluoromethyl and Q is an oxygen atom or a sulfur atom. Ring C is linked to Ring B at an unsubstituted carbon atom of Ring B meta or para to the anilide nitrogen. The substituents $Y_1$, $Y_2$, X and $X_1$ on the aromatic rings need not be the same on any one compound.

In the compounds constituting the most preferred embodiments of the invention $Y_3$ is hydrogen, Ring B has 0–1 radicals X and Ring C has 1–2 radicals $X_1$. In these preferred embodiments there is no more than 1 trifluoromethyl radical in each of the B and C rings, i.e., those rings may be polyhalogenated but would normally have either no trifluoromethyl group or only one such radical. The remaining carbon atoms of the aromatic rings are, as will be understood by those skilled in the art, substituted with hydrogen.

Also within the scope of the present invention are the pharmaceutically acceptable replacement or addition salts of Formula I such as metal salts, exemplified by sodium, potassium, calcium, copper and the like, and amine salts such as the pyridine, piperazine, methylamine, ethanolamine salts, and the like. It is also contemplated that the 2-hydroxy thiobenzanilides of this invention can be employed in combination with other known non-antagonistic anthelmintic agents such as thiobenzazole, tetramisole, piperazine, phenothiazine, pyrantel, and the like. The type of combination to be employed would depend upon the type of and degree of infection to be combatted and the mode of administration.

Typical of the compounds within the scope of the present invention are:

3,5-dibromo-2-hydroxy-4'-phenoxy-thiobenzanilide,
3,5-dichloro-2-hydroxy-4'-phenoxy-thiobenzanilide,
3,5-diiodo-2-hydroxy-4'-phenoxy-thiobenzanilide,
3,5-dibromo-2-hydroxy-4'-(p-chlorophenoxy)-thiobenzanilide,
3,5-dibromo-2-hydroxy-4'-(p-fluorophenoxy)-thiobenzanilide,
3,5-dichloro-2-hydroxy-4'-(p-chlorophenoxy)-thiobenzanilide, 3,5-dibromo-2-hydroxy-3'-chloro-4'-phenoxy-thio-
benzanilide,
3,5-dibromo-2-hydroxy-4'-(p-fluorophenoxy)-thio-
benzanilide,
3,5-dibromo-2-hydroxy-3'-(trifluoromethyl)-4'-(p-
chlorophenoxy)-thiobenzanilide,
3,5-dibromo-2-hydroxy-3'-bromo-4'-(p-bromo-
phenoxy)-thiobenzanilide,
3,5-dichloro-2-hydroxy-3'-chloro-4'-(p-chloro-
phenoxy)-thiobenzanilide,
3,5-dibromo-2-hydroxy-3',5'-dichloro-4'-phenoxy-
thiobenzanilide,
3,5-dibromo-2,6-dihydroxy-3'-chloro-4'-(p-chloro-
phenoxy)-thiobenzanilide,
3-bromo-2-hydroxy-5-nitro-3'-chloro-4'-(p-chloro-
phenoxy)-thiobenzanilide,
3,3'-dibromo-2-hydroxy-5-nitro-4'-(p-bromo-
phenoxy)-thiobenzanilide,
5-bromo-2-hydroxy-3-nitro-3'-chloro-4'-(p-chloro-
phenoxy)-thiobenzanilide,
3,5-dibromo-2-hydroxy-4'-(m,p-dichlorophenoxy)-
thiobenzanilide,
3'-chloro-3,5-diiodo-2-hydroxy-4'-(o,p-dichloro-
phenoxy)-thiobenzanilide,
3,5-dibromo-2-hydroxy-3',5'-dichloro-4'-(p-chloro-
phenoxy)-thiobenzanilide,
3,5-dibromo-2-hydroxy-4'-chloro-3'-(p-chloro-
phenoxy)-thiobenzanilide,
3,5-dichloro-2-hydroxy-4'-chloro-3'-(p-chloro-
phenoxy)-thiobenzanilide,
3-bromo-2-hydroxy-5-nitro-4'-chloro-3'-(p-chloro-
phenoxy)-thiobenzanilide,
3,5-dibromo-2-hydroxy-4',5'-dichloro-3'-(m,p-di-
chlorophenoxy)-thiobenzanilide,
3,5-dibromo-2-hydroxy-4'-(p-chlorophenylthio)-
thiobenzanilide,
3,5-dibromo-2,6-dihydroxy-2'-chloro-3'-(p-chloro-
phenoxy)-thiobenzanilide,
3,5-dibromo-2-hydroxy-4'-(p-bromophenylthio)-
thiobenzanilide,
3,5-dibromo-2-hydroxy-2'-chloro-4'-(p-trifluoro-
methylphenoxy)-thiobenzanilide, and
3,5-dibromo-2-hydroxy-4'-(p-trifluoro-
methylphenoxy)-thiobenzanilide.

The compounds of the present invention may be prepared from an appropriately substituted salicylanilide (II) via a three-step process as shown by the following flow diagram:

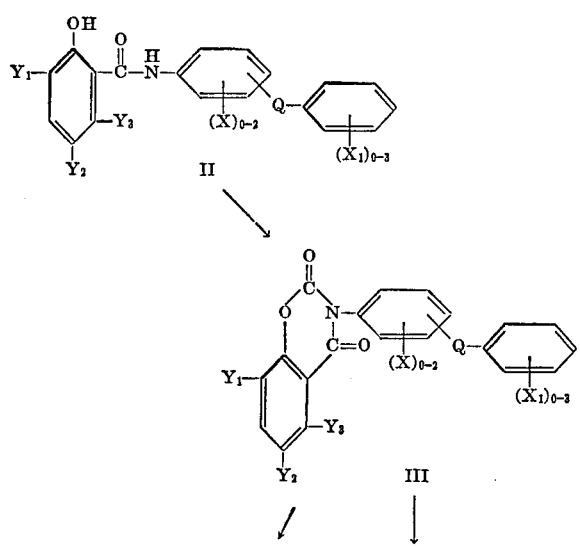
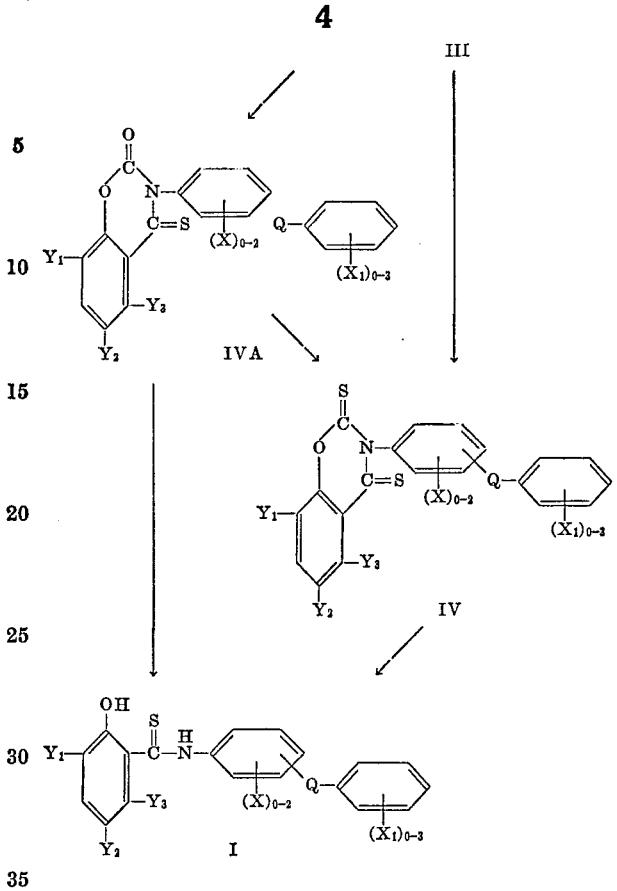

where $Y_1$, $Y_2$, $Y_3$, X, $X_1$ and Q are as previously defined.

The first step involves the preparation of the benzoxazinedione (III). The reaction can be brought about by treating an appropriately substituted salicylanilide with a loweralkyl halocarbonate such as ethyl chlorocarbonate, or by reaction with phosgene or thiophosgene in a solvent such as pyridine or collidine. Other reagents which can be employed are a loweralkyl halothiolcarbonate such as methyl chlorothiolcarbonate, a loweralkyl halothionecarbonate such as ethyl chlorothionecarbonate, a loweralkyl halodithiocarbonate such as propyl chlorodithiocarbonate, and thiophosgene. Where either a loweralkyl halocarbonate, a loweralkyl halothiolcarbonate, or phosgene is employed, the product obtained is a 2,4-dihydrobenzoxazinedione. Where either a loweralkyl halothionecarbonate, a loweralkyl halodithiocarbonate or thiophosgene is employed, the product of the reaction is a 2-oxo-2-thionedihydrobenzoxazine. Reaction of either of the above benzoxazines with phosphorus pentasulfide yields a 2,4-dihydrobenzoxazinedithione (IV). The substituents Q, $Y_1$, $Y_2$, $Y_3$, X and $X_1$, which are desired in the final product (I) should be present in the starting salicylanilide. Any inert solvent may be used, but where a non-basic solvent is employed, such as chlorobenzene, it is necessary to add at least one equivalent of a tertiary base such as pyridine or triethylamine. Where phosgene is employed with a non-basic solvent instead of an alkyl haloformate, it is necessary to use at least 2 equivalents of base. The salicylanilide is generally dissolved in the solvent, and the alkyl haloformate or phosgene is added slowly while the reaction mixture is cooled to 0°–5° C. For maximum yields it is preferred to use dry solvents. After the addition is complete, the reaction mixture is generally stirred for about 1–2 hours to ensure complete reaction. The mixture is then heated, generally at the reflux temperature of the solvent, for about 4–6 hours, is cooled slowly to room temperature and is then poured into an ice-water mixture, and the entire mixture is stirred until the benzoxazinedione (III) solidifies. The solid is then filtered off and purified by recrystallization from a suitable solvent, such as ethyl acetate or ethanol, or by other techniques known in the art.

The second step involves the preparation of a benzoxazinedithione (IV) via reaction of the benzoxazinedione with phosphorus pentasulfide. The phosphorus pentasulfide and the benzoxazinedione are first intimately mixed. This can be conveniently carried out in a mortar or some other suitable apparatus. The powdered mixture is then transferred to a suitable container, for example, a round-bottom flask, and is heated, generally in an oil bath, for about 25–60 minutes at temperatures ranging from about 140°–250° C. The preferred temperature range is about 200°–230° C. The melt is then allowed to come to room temperature, and the resultant solid is pulverized in a suitable vessel, such as a mortar. The powder is stirred in a solution, preferably saturated, of a weak base, such as sodium carbonate, potassium carbonate and the like, water, and an alcohol, such as methanol or ethanol, and the solid residue is then extracted with a suitable hot solvent such as boiling dioxane. The extract is concentrated to a solid residue, which generally can be crystallized from a suitable solvent such as ethyl acetate, ethanol, or a mixture of solvents.

The final step in the synthesis of the novel 2-hydroxy thiobenzanilides involves heating the benzoxazinedithione (IV) in an inert solvent such as dioxane, tetra hydrofuran, or some other inert water-soluble solvent. The benzoxazinedithione is stirred in the solvent at about 50°–100° C., depending upon the solvent used, and an aqueous solution of a base such as potassium hydroxide or sodium hydroxide at a concentration of about 1 N is added to the warm solution with stirring. The reaction mixture is allowed to cool to room temperature and is then acidified with an aqueous mineral acid such as sulfuric or hydrochloric acid. An oil generally settles out of the acidic solution, and the crude product is extracted with a suitable solvent such as chloroform, methylene chloride, ethyl acetate, ether, etc. The extract is then concentrated to an oil which generally crystallizes on standing, but which can be further purified by column chromatography or by other techniques known in the art. During the reaction between the benzoxazinedione and phosphorus pentasulfide, a mixture of monothiobenzoxazine and dithiobenzoxazine is sometimes obtained. This results from the fact that the oxygen on the C-4 carbon is first replaced by sulfur. Upon continued heating at higher temperatures, the oxygen on the C-2 carbon is subsequently replaced by sulfur. The amount of the monothiobenzoxazine present in the mixture depends, therefore, upon the reaction temperature selected and the length of the heating period. The 2-hydroxy thiobenzanilide can be obtained by treating the mono- or di-thiobenzoxazine or a mixture of the mono- and di-thiobenzoxazines with aqueous alkali.

The 2-hydroxy thiobenzanilides can also be prepared by reacting an appropriately substituted salicylanilide directly with phosphorus pentasulfide in a suitable solvent such as pyridine, benzene, toluene, xylene, diethylene glycol, or diethyl ether. Generally, approximately equimolar amounts of the reactants are employed, and the mixture is heated at temperatures of about 80°–200° C., or at the reflux temperature of the solvent, for about 3–6 hours. The reaction mixture is then poured, generally while still hot, into hot water, with stirring, and the stirring is continued until the temperature of the mixture drops to room temperature. The product generally precipitates out of solution and is collected by filtration and washed several times with hot water. The dried crude product can be recrystallized from a suitable solvent, such as benzene, or it can be purified by column chromatography over silica gel, or by other techniques known in the art. For maximum yields, the phenolic group may be protected during the reaction wtih phosphorus pentasulfide by a group such as benzyl, acyl or allyl, which can be easily removed after formation of the thiobenzanilide.

The novel 2-hydroxy thiobenzanilides can also be prepared by reacting an appropriately substituted phenol with an appropriately substituted phenoxyphenylisothiocyanate. The reaction scheme is depicted in the following flow diagram:

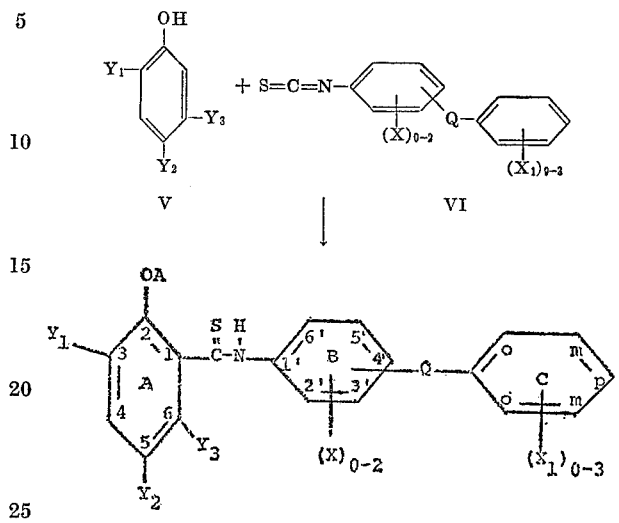

wherein $Y_1$, $Y_2$, $Y_3$, $X$, $X_1$ and $Q$ are as previously defined. A mixture of the phenol and the phenoxyphenylisothiocyanate is treated with an anhydrous metal halide such as aluminum chloride, boron trifluoride, stannic chloride, or zinc chloride. The use of a solvent is optional, but where a solvent is employed, solvents like carbon tetrachloride, carbon disulfide, or mono- or poly-chlorobenzene are suitable. The initial reaction is generally exothermic, and the mixture is allowed to stand for 5–12 hours at room temperature, after which it is heated at about 60°–150° C., generally for about 4–8 hours, to ensure complete reaction. The reaction mixture is then poured into a mixture of a mineral acid, such as hydrochloric acid, and ice, in order to decompose the metal complex formed and to bring the metal salts into the aqueous phase. The oily residue is separated from the aqueous phase and is then dissolved in dilute aqueous alkali such as sodium hydroxide or potassium hydroxide. The solution is then filtered, and the filtrate is acidified with a dilute acid, such as acetic acid, after which the product generally precipitates out of solution. The product is collected by filtration or by other known techniques and is then crystallized from a suitable solvent, such as ether-petroleum benzin mixtures, and hexane. Where the oily residue is not easily separated from the aqueous phase, it can be extracted with a suitable solvent such as chloroform or methylene chloride. The extract is washed several times with dilute aqueous acid, such as hydrochloric acid, and finally with water. After drying, the solvent is removed in vacuo and the product is purified by crystallization from a suitable solvent. This method is particularly suited for making those compounds of Formula I where $Y_3$ is hydroxy.

The phenoxyphenylisothiocyanate compounds used in the above reaction can be prepared by reacting an appropriately substituted phenoxyaniline with thiophosgene in a suitable solvent such as benzene or toluene. The thiophosgene is added at room temperature to a solution of the substituted aniline. After the addition is complete the mixture is heated, generally at reflux, for 1–3 hours. The solvent is removed in vacuo and the residue is purified by techniques known in the art.

Still another process for the preparation of the novel 2-hydroxy thiobenzanilides involves the reaction of an appropriately substituted 2-hydroxy benzonitrile with an appropriately substituted aniline compound in the presence of hydrogen sulfide in a suitable solvent. Lower-alkanols, such as ethanol, methanol, and propanol, tertiary amines, such as pyridine, and triethylamine, aromatic hydrocarbons such as benzene and toluene, dioxane, and acetone are suitable solvents for this reaction. The 2-hydroxy benzonitrile and an excess of the substituted aniline are mixed with the solvent, and the mixture is cooled to about 0°–5° C. Hydrogen sulfide is introduced into the system, generally to the point of saturation, and the entire mixture is heated in a closed system at about 100°–150° C. for about 10–15 hours. The reaction mixture is then cooled to about 5°–10° C. before opening the system, and the solution is concentrated in vacuo. Water is generally added at this point, and the mixture is extracted with a suitable solvent such as chloroform or methylene chloride. The solvent is removed in vacuo and the residue is crystallized from a suitable solvent such as benzene-petroleum benzin. The crude product can be purified by column chromatography over silica gel, or purification can be achieved by other techniques known in the art. The substituted 2-hydroxy benzonitrile can be prepared by dehydration of the corresponding amide, and the substituted anilines are prepared as hereinafter described.

Compounds (I) where A is lower alkanoyl and $Y_3$ is hydrogen can be prepared from the 2-hydroxy thiobenzanilide by acylating the thiobenzanilide with a suitable acylating agent, such as acetic anhydride.

The compounds of the present invention have utility in the field of animal therapy. They are effective anthelmintics and are especially effective against mature and immature liver fluke of the species *Fasciola gigantica* and *Fasciola hepatica,* the common liver fluke in sheep and cattle. For effective treatment, certain dosage levels are desired, depending upon the compound employed, the type of animal to be treated, and the particular helminth being combatted. In general, effective fluke efficacy is achieved when the compound is administered in a single dose at dosage levels of from about 1–300 mg./kg. of animal body weight, and preferably from about 2–50 mg./kg. of animal body weight.

The compounds of the present invention may be administered in a variety of ways, depending upon the particular animal to be treated, the type of anthelmintic treatment normally given to such an animal, the materials employed, and the particular helminth being combatted. It is preferred to administer them in a single efficacious oral or parenteral dose at a time when fluke infection is apparent or suspected. Because of their good solubility in fat, parenteral administration of the novel 2-hydroxythiobenzanilides is a preferred method.

In general, compositions containing the active anthelmintic compound are employed, the amount of the anthelmintic ingredient in the composition, as well as the remaining constituents varying according to the type of treatment to be employed, the host animal, and the particular parasitic disease being treated. In general, however, compositions containing a total weight percent of the active compound or compounds ranging from 0.001 to 95% will be suitable with the remainder being any suitable carrier or vehicle. Furthermore, the compositions should contain enough of the active compound to provide an effective dosage for the proper treatment of the parasitic disease.

A number of modes of treatment may be employed, and each to some extent determines the general nature of the composition. For example, the anthelmintic compounds may be administered to domesticated animals in a single unit oral dosage form such as a tablet, bolus, capsule or drench, in a liquid oil base form suitable for parenteral administration, or they may be compounded as a feed premix to be later admixed with the animal's food.

When the compositions are to be solid unit dosage forms as tablets, capsules, or boluses, the ingredients other than the active compounds may be any other non-toxic pharmaceutically acceptable vehicles convenient in the preparation of such forms, and preferably materials nutritionally suitable, such as starch, lactose, talc, magnesium stearate, vegetable gums, and the like. Moreover, when capsules are employed, the active compound may be used in essentially undiluted form, the only extraneous material being that of the capsule casing itself which may be hard or soft gelatin or any other pharmaceutically acceptable encapsulating material. When the dosage form is to be used for parenteral administration, the active material is suitably admixed with an acceptable oil base vehicle, preferably of the vegetable oil variety, such as peanut oil, cottonseed oil, and the like. In all of such forms, i.e., in tablets, boluses, capsules, and oil base formulations, the active compound conveniently ranges from about 5 to 80% by weight of the total composition.

When the unit dosage form is to be in the form of a drench, the anthelmintic agents may be mixed with agents which will aid in the subsequent suspending of the active compound in water, such as bentonite, clays, water-soluble starches, cellulose derivatives, gums, surface active agents and the like to form a dry pre-drench composition, and this pre-drench composition added to water just before use. In the pre-drench formulation, in addition to the suspending agent, such ingredients as preservatives, antifoam compounds, and the like may be employed. Such a dry product may contain as much as 95% by weight of the active compound, the rest being contributed by the excipients. Preferably, the solid composition contains from 30% to 95% by weight of the active compound. Enough water should be added to the solid product to provide the proper dosage level within a convenient amount of liquid for a single oral dose. The commonly used measure in the field is one fluid ounce of material and thus that one fluid ounce of material should contain enough of the anthelmintic compound to provide the effective dosage level. Liquid drench formulations containing from about 10 to 30 weight percent of dry ingredients will in general be suitable with the preferred range being from 15 to 50 weight percent.

Where the compositions are intended to be used as feeds, feed supplements or feed premixes, they will be mixed with suitable ingredients of an animal's nutrient ration. The solid orally ingestible carriers normally used for such purposes, such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like are all suitable. The active compounds are intimately dispersed or admixed throughout the solid inert carrier by methods such as grinding, stirring, milling or tumbling. By selecting proper diluents and by altering the ratio of carrier to active ingredient, compositions of any desired concentration may be prepared. Feed supplement formulations containing from about 10 to 30% by weight of active ingredient are particularly suitable for addition to feeds. The active compound is normally dispersed or mixed uniformly in the diluent but in some instances may be adsorbed on the carrier.

These supplements are added to the finished animal feed in an amount adequate to give the final concentration desired for controlling or treating the helminth infection by way of the animal ration. Although the preferred level in feeds will depend on the particular compounds being employed, the active compounds of this invention are normally fed at levels of 0.05–25% in the feed. As stated above, animals are preferably treated at a time when the infestation is apparent or suspected and the most preferred method for such treatment is via the single oral dose technique. Thus, administration of medicated feed is not preferred but may certainly be employed. Similarly, the amounts of drug present in the feed may be reduced to levels in the order of 0.001% to 3.0 weight percent based on the weight of feed, and the medicated feed administered over prolonged periods. This would be in the nature of a preventive or prophylactic measure but again is not the mode of choice. Another method of administering the compounds of this invention to animals whose feeds are conveniently pelleted, such as sheep, is to incorporate them directly in the pellets. For instance, the anthelmintic compound is readily incorporated in nutritionally adequate alfalfa pellets at levels of 2 to 110 grams per pound of pellets for therapeutic use, and at lower levels for prophylactic use, and such pellets fed to the animals.

In addition to their use in the treatment of helminthiasis, some of the 2-hydroxy thiobenzanilides are useful as antifungal agents and as antibacterial agents. For example, 3'-chloro-(4'-p-chlorophenoxy) - 3,5-dibromo-2-hydroxy-thiobenzanilide will inhibit the growth of *Aspergillus niger* at 6.25 microgram/cc. and will inhibit the growth of *Penicillium expansum* at 1.56 microgram/cc.

As antibacterial agents the compounds show activity against *Staphylococcus aureus*, *Escherchia coli* and *Proteus vulgaris*. The activity against *Staphylococcus aureus* is of particular interest, since this organism is common on the skin and is associated with many wound infections.

The following examples are given for the purpose of illustration and not by way of limitation:

EXAMPLE 1

3-(3-chloro-4-p-chlorophenoxyphenyl)-6,8-dibromo-2,4-(2H,4H)-benzoxazinedione 50 grams of 3,5-dibromo-3'-chloro-4'-(p-chlorophenoxy) salicylanilide is dissolved in 125 ml. of dry pyridine, and the solution is cooled in an ice bath with stirring. 18.3 ml. of ethyl chloroformate is added dropwise. The reaction mixture is stirred at 0° C. for one hour after addition is complete. The mixture is then heated to reflux and is refluxed for 5 hours, after which the mixture is allowed to cool to room temperature, poured into 500 ml. of ice-water, and stirred until the product crystallizes. The solid is filtered off, washed with water, dried, and upon recrystallization from ethyl acetate, 28 grams of 3-(3-chloro - 4 - p - chlorophenoxyphenyl)-6,8-dibromo-2,4-(2H,4H)-benzoxazinedione, M.P. 238°–239° C., are obtained.

When in the above procedure 3,5-dibromo-3'-chloro-4'-(o,p-dichlorophenoxy)-salicylanilide,
3-nitro-5-bromo-3'-bromo-4'-(p-bromophenoxy)-salicylanilide,
3,5-dibromo-3',5'-dichloro-4'-(p-chlorophenoxy)-salicylanilide and
3,5-diiodo-3'-chloro-4'-(p-chlorophenoxy)-salicylanilide are substituted for 3,5-dibromo-3'-chloro-4'-(p-chlorophenoxy)-salicylanilide, there are obtained 3-(3-chloro-4-o,p-dichlorophenoxyphenyl)-6,8-dibromo-2,4-(2H,4H)-benzoxazinedione,
3-(3-bromo-4-p-bromophenoxyphenyl)-6-bromo-8-nitro-2,4-(2H,4H)-benzoxazinedione,
3-(3,5-dichloro-4-p-chlorophenoxyphenyl)-6,8-dibromo-2,4-(2H,4H)-benzoxazinedione, and
3-(3-chloro-4-p-chlorophenoxyphenyl)-6,8-diiodo-2,4-(2H,4H)-benzoxazinedione.

EXAMPLE 2

3-(3-chloro-4-p-chlorophenoxyphenyl)-6,8-dibromo-2,4-(2H,4H)-benzoxazinedithione 5.58 grams of 3-(3-chloro-4-p-chlorophenoxyphenyl)-6,8 - dibromo - 2,4-(2H,4H)-benzoxazinedione and 4.44 grams of phosphorus pentasulfide are intimately mixed in a mortar. The mixture is transferred to a 250 ml. round-bottom flask and is heated in an oil bath for 30 minutes at 220°–230° C. The mixture is allowed to cool to room temperature, the solid is pulverized in a mortar, and the powder is stirred in a saturated solution of sodium carbonate, filtered, and washed thoroughly with a saturated sodium carbonate solution, water, and finally methanol. The solid residue is then extracted with 150 ml. of boiling dioxane, after which the dioxane extract is concentrated to an orange solid. Upon recrystallization from an ethyl acetate-ethanol mixture, 3.4 grams of 3-(3-chloro - 4 - p - chlorophenoxyphenyl)-6,8-dibromo-2,4- - (2H,4H) - benzoxazinedithione, M.P. 222°–224° C., are obtained.

When the above procedure is repeated using 3-(3-chloro-4-o,p-dichlorophenoxyphenyl)-6,8-dibromo-2,4-(2H,4H)-benzoxazinedione,
3-(3-bromo-4-p-bromophenoxyphenyl)-6-bromo-8-nitro-2,4-(2H,4H)-benzoxazinedione,
3-(3,5-dichloro-4-p-chlorophenoxyphenyl)-6,8-dibromo-2,4-(2H,4H)-benzoxazinedione and
3-(3-chloro-4-p-chlorophenoxyphenyl)-6,8-di-iodo-2,4-(2H,4H)-benzoxazinedione are used in place of 3-(3-chloro-4-p-chlorophenoxyphenyl) - 6,8 - dibromo - 2,4 - (2H,4H)-benzoxazinedione, there are obtained 3-(3-chloro-4-o,p-dichlorophenoxyphenyl)-6,8-dibromo-2,4-(2H,4H)-benzoxazinedithione,
3-(3-bromo-4-p-bromophenoxyphenyl)-6-bromo-8-nitro-2,4-(2H,4H)-benzoxazinedithione,
3-(3,5-dichloro-4-p-chlorophenoxyphenyl)-6,8-dibromo-2,4-(2H,4H)-benzoxazinedithione, and
3-(3-chloro-4-p-chlorophenoxyphenyl)-6,8-di-iodo-2,4-(2H,4H)-benzoxazinedithione respectively, are obtained.

EXAMPLE 3

3,5-dibromo-2-hydroxy-3'-chloro-4'-(p-chlorophenoxy)-thiobenzanilide

A solution of 30 grams of 3-(3-chloro-4-p-chlorophenoxyphenyl) - 6,8-dibromo-2,4-(2H,4H)-benzoxazinedithione in 200 ml. of dioxane is stirred at 80° C. 204 ml. of a 1 N aqueous potassium hydroxide solution is warmed to 80° C., the warm basic solution is added to the dioxane solution, and the mixture is stirred at 80° C. for 30 minutes. The reaction mixture is allowed to cool to room temperature and is then acidified with 2.5 N aqueous hydrochloric acid. The oil which precipitates is extracted with chloroform, and the chloroform extract is concentrated to an orange oil. The crude product is purified on a column of 60 grams of silica gel, from which 20 grams of yellow oil are obtained. Upon crystallization from a benzene-petroleum benzin mixture, 16 grams of 3,5-dibromo-2-hydroxy-3'-chloro-4'-(p-chlorophenoxy)-thiobenzanilide, M.P. 135°–137° C., are obtained.

When in the above procedure 3-(3-chloro-4-o,p-dichlorophenoxyphenyl)-6,8-dibromo-2,4-(2H,4H)-benzoxazinedithione,
3-(3-bromo-4-p-bromophenopyphenyl)-6-bromo-8-nitro-2,4-(2H,4H)-benzoxazinedithione,
3-(3,5-dichloro-4-p-chlorophenoxyphenyl)-6,8-dibromo-2,4-(2H,4H)-benzoxazinedithione and
3-(3-chloro-4-p-chlorophenoxyphenyl)-6,8-diiodo-2,4-(2H,4H)-benzaxazinedithione are used in place of 3-(3-chloro-4-p-chlorophenoxyphenyl)-6,8-dibromo-2,4-(2H,4H)-benzoxazinedithione, there are obtained 3,5-dibromo-2-hydroxy-3'-chloro-4'-(o,p-dichlorophenoxy)-thiobenzanilide,
3',5'-dibromo-2-hydroxy-3-nitro-4'-(p-bromophenoxy)-thiobenzanilide,
3,5-dibromo-2-hydroxy-3',5'-dichloro-4'-(p-chlorophenoxy)-thiobenzanilide, and
3,5-di-iodo-2-hydroxy-3'-chloro-4'-(p-chlorophenoxy)-thiobenzanilide, respectively.

EXAMPLE 4

3,3',5-trichloro-2-hydroxy-4'-(p-chlorophenoxy)-thiobenzanilide (A) 50.8 grams (0.2 mole) of 3-chloro-4-(p-chlorophenoxy)-phenylamine is dissolved in 300 ml. of toluene. 28.5 grams (0.25 mole) of phosgene is added dropwise to the toluene solution. The temperature rises to 50° C., and a thick precipitate forms. After the addition of the phosgene is complete, the mixture is refluxed for 1 hour during which time the precipitate dissolves in the solvent. The solution is filtered hot and the filtrate is evaporated to dryness. The dark oily residue crystallizes on standing. Upon recrystallization from hexane, 34.8 grams of 3-chloro-4-(p-chlorophenoxyphenyl)-isothiocyanate, M.P. 50°–52° C., are obtained. Other isothiocyanates of the formula

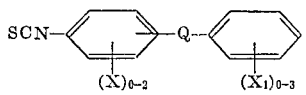

where X and $X_1$ are as previously defined and obtained in a similar fashion by reaction of phosgene with the appropriately substituted phenylamine.

(B) A mixture of 16.9 grams of o,p-dichlorophenol and 29.6 grams of 3-chloro-4-(p-chlorophenoxyphenyl)-isothiocyanate is treated with 20 grams of anhydrous aluminum chloride and the mixture is slowly heated to 125° C., after which it is allowed to stand for about 15 hours at this temperature. The reaction mixture is then poured onto a mixture of ice and hydrochloric acid. The oily residue which separates is removed and is dissolved in dilute aqueous sodium hydroxide, filtered, and the filtrate is acidified with acetic acid. The crude product which precipitates from the acid solution is filtered, washed with water, and upon recrystallization from an ether-petroleum benzin mixture, essentially pure 3,3′,5-trichloro-2-hydroxy-4′-(p-chlorophenoxy)-thiobenzanilide is obtained.

When in the above procedure 2,4-dibromoresorcinol and 3-chloro-4-(p-chlorophenoxyphenyl)-isothiocyanate, and 2,4-di-iodoresorcinol and 4-p-fluorophenylthiophenyl isothiocyanate are used as reactants in place of p-chlorophenol and 3-chloro-4-(p-chlorophenoxyphenyl)-isothiocyanate, there are obtained 3,5-dibromo-2,6-dihydroxy-3′-chloro-4′-(p-chlorophenoxyphenyl)-thiobenzanilide and 3,5-di-iodo - 2,6 - dihydroxy-4′-(p-fluorophenylthio)-thiobenzanilide, respectively.

EXAMPLE 4

3,5-dibromo-2-hydroxy-3′-chloro-4′-(p-chlorophenoxy)-thiobenzanilide

A mixture of 15.1 grams (0.05 mole) of 2-hydroxy-3,5-dibromo benzonitrile and 25.4 grams (0.1 mole) of 3-chloro-4-p-chlorophenoxyaniline is dissolved in 400 ml. of ethyl alcohol, cooled to 0° C., and saturated with hydrogen sulfide. The entire mixture is then heated in a closed system at 100° C. for 10 hours. The reaction mixture is cooled to 5°–10° C. before opening the system, and the solution is concentrated in vacuo to a volume of 100 ml. The concentrated solution is then poured into 500 ml. of water, and the gummy precipitate extracted with chloroform. The chloroform extract is concentrated in vacuo, and the residue is purified by chromatography on 75 grams of silica gel. The yellow oil obtained from the chromatography is crystallized from benzene-petroleum benzin, yielding essentially pure 3,5-dibromo-2-hydroxy-3′-chloro-4′-(p-chlorophenoxy)-thiobenzanilide, M.P. 134°–136° C.

When in the above procedure 2-hydroxy-3-nitro-5-bromo-benzonitrile and 2-hydroxy - 3,5 - di-iodo-benzonitrile are substituted for 2-hydroxy-3,5-dibromo-benzonitrile, there are obtained 3-nitro-5-bromo-2-hydroxy-3′-chloro-4′-(p-chlorophenoxy)-thiobenzanilide and 2-hydroxy-3,5-di-iodo-3′-chloro-4′-(p - chlorophenoxy)-thiobenzanilide, respectively.

EXAMPLE 6

3,5,3′-trichloro-4′-(p-chlorophenoxy)-2-hydroxy-thiobenzanilide

A mixture of 5.48 grams (0.10 mole) of 3,5,3′-trichloro-4′-(p - chlorophenoxy)-salicylanilide and 2.22 grams (0.1 mole) of phosphorus pentasulfide in 35 ml. of dry pyridine is refluxed 3 hours with stirring. The hot reaction mixture is then poured slowly into 250 ml. of hot water with stirring. The suspension is stirred until the temperature of the mixture falls to room temperature, after which the solid is collected by filtration. The precipitate is washed with hot water, and dried in vacuo. The dried crude product is chromatographed on 20 grams of silica gel, yielding an oil which crystallizes from benzene-petroleum benzin. Recrystallization from benzene-petroleum benzin yields essentially pure 3,5,3′-trichloro-4′-(p-chlorophenoxy)-2-hydroxy thiobenzanilide.

When in the above procedure 3,5-dibromo-3′-chloro-4′-(o,p-dichlorophenoxy)salicylanilide, 3′,5 - dibromo-3-nitro-4′-(p-bromophenoxy)-salicylanilide, and 3,5,3′,5′-tetrabromo-4′-(p-chlorophenoxy)-salicylanilide are substituted for 3,5-dibromo-3′-chloro-4′-(p-chlorophenoxy)-salicylanilide, there are obtained 3,5-dibromo-2-hydroxy-3′-chloro-4′-(o,p-dichlorophenoxy)-thiobenzanilide, 3′,5-dibromo - 2 - hydroxy-3-nitro-4′-(p-bromophenoxy)-thiobenzanilide, and 3,5,3′,5′-tetrabromo - 2 - hydroxy-4′-(p-chlorophenoxy)-thiobenzanilide, respectively.

EXAMPLE 7

3,5-di-iodo-2-hydroxy-4′-chloro-3′-(m-trifluoromethylphenoxy)-thiobenzanilide (A) A mixture of 38.4 grams (0.2 mole) of 3,4-dichloronitrobenzene, 33.0 grams (0.22 mole) of m-trifluoromethylphenol, 30.4 grams (0.22 mole) of anhydrous potassium carbonate in 200 ml. of dimethylformamide is stirred on the steam bath for 3 days. It is then poured into 600 ml. of water, allowed to crystallize, filtered, dried, recrystallized from methanol to yield 54.5 grams of 2 - chloro - 4 - nitro-3′-trifluoromethylbiphenyl ether, which melts at 99–101° C.

(B) A solution of 54.3 grams of 2-chloro-4-nitro-3′-trifluoromethylbiphenyl ether in 400 ml. of ethanol is hydrogenated in the presence of Raney nickel catalyst under 40 lbs. of pressure. When the theoretical amount of hydrogen is taken up, the reaction mixture is filtered from the catalyst and concentrated in vacuo to an oily residue. This is crystallized from petroleum benzine to yield 36.6 grams of 4-amino-2-chloro-3′-trifluoromethyl biphenyl ether, M.P. 76–77° C.

(C) A solution of 35.4 grams (0.123 mole) of 4-amino-2-chloro-3′-trifluoromethylbiphenyl ether in 150 ml. of benzene is stirred in an ice bath for 5 minutes; 33 ml. of acetic anhydride is then added. The ice bath is removed after a further ten minutes. The reaction mixture is left at room temperature for 24 hours. It is then poured into ice water and stirred 12 hours. The solid is then collected by filtration and dried to give 37.5 g. of 4-acetylamino-2-chloro-3′-trifluoromethyl biphenylether, M.P. 100–102° C.

(D) A solution of 3.3 g. of 4-acetylamino-2-chloro-3′-trifluoromethyl biphenylether in a mixture of 11 ml. of acetic acid and 7.5 ml. of acetic anhydride is stirred at 35 to 40° C. while 0.71 ml. of 90% nitric acid is added dropwise over 10 minutes. After another 30 minutes of stirring at the above temperature a crystalline precipitate begins to form. The reaction mixture is left for one hour at room temperature and then poured into a mixture of 21 ml. of water, 5.4 ml. of concentrated sulfuric acid and 17 ml. of ethanol. This is boiled under reflux for two hours, cooled and the oil which separates is extracted with chloroform. The chloroform extract is concentrated in vacuo to an oil which is recrystallized from benzene-petroleum benzin to yield 1.7 g. of 4-amino-2-chloro-5-nitro-3′-trifluoromethyl biphenyl ether, M.P. 93–95° C.

(E) A solution of 3.33 g. (0.01 mole) of 4-amino-2-chloro-5-nitro-3′-trifluoromethyl biphenylether in 27 ml. of dioxane and 9.3 ml. of ethanol is stirred at room temperature. 1.5 ml. of concentrated sulfuric acid is added at once, then the temperature is raised to reflux. A solution of 1.035 g. of sodium nitrite in 2 ml. of water is added during 5 minutes to the well-stirred and boiling reaction mixture. Stirring is continued for 10 minutes at reflux temperature, then the reaction mixture is allowed to come to room temperature. Water (ca. 10 ml.) is added until an oil separates out. This is extracted with 100 ml. of chloroform, the chloroform extract is washed and concentrated in vacuo to an oil. This is dissolved in 150 ml. of ethanol and hydrogenated under 40 lbs. of pressure in the presence of a Raney nickel catalyst. When the theoretical amount of hydrogen is taken up, the reaction mixture is filtered from the catalyst and the filtrate is concentrated in vacuo to a dark oil comprising 5-amino-2-chloro-3'-trifluoromethyl biphenylether, which is used directly in the next reaction.

4'-chloro-3,5-di-iodo-3'-(m-trifluoromethylphenoxy)-salicylanilide (F) A mixture of 10 g. (0.026 mole) of 3,5-di-iodosalicylic acid, 7.5 g. (0.026 mole) of 5-amino-2-chloro-3'-trifluoromethyl-biphenylether, 77 ml. of chlorobenzene and 0.9 ml. of phosphorous trichloride is stirred and refluxed for 3 hours. Then the solution is decanted hot from some gummy residue and concentrated to a smaller volume until crystallization begins. The crystalline 3,5-di-iodo-4'-chloro-3'-(m-trifluoromethylphenoxy) - salicylanilide is collected by filtration and used for the next reaction.

(G) A solution of 6.4 g. (.01 mole) of 3,5-di-iodo-4-chloro-3'-(m-trifluoromethylphenoxy)-salicylanilide in 27 ml. of pyridine is stirred at 0 to 10° C. while 2.2 g. (0.02 mole) of ethyl chloroformate is added dropwise during 30 minutes. Then the reaction mixture is stirred for 1 hour at room temperature and for 5 hours at reflux. The mixture is allowed to come to room temperature and then poured into 140 ml. of ice water. When crystallization is complete, the crystals are filtered and washed with water. The solid is dried to constant weight and is then boiled in ethyl acetate with some charcoal, filtered hot and allowed to crystallize. Filtration gives the crystalline 3-(4-chloro-3-m-trifluoromethylphenoxyphenyl) - 6,8 - di-iodo-2,4-(2H,4H)-benzoxazinedione.

(H) A mixture of 3.0 g. of 3-(4-chloro-3-m-trifluoromethylphenoxyphenyl) - 6,8 - di-iodo-2,4-(2H,4H)-benzoxazinedione and 2.5 g. of phosphorous pentasulfide is heated with occasional stirring until melted at 240–250° C. It is kept for 30 minutes at this temperature, then allowed to come to room temperature. The solid is powdered in a mortar then washed in a sintered glass funnel repeatedly with an aqueous sodium carbonate solution and then water. The solid residue is then boiled with about 100 ml. of dioxane, filtered, and the dioxane solution is concentrated in vacuo to a brown solid of crude 3-(4-chloro - 3 - m-trifluoromethylphenoxyphenyl)-6,8-di-iodo-2,4-(2H,4H)-benzoxazinedione. 1.0 g. of this product is dissolved in 10 ml. of dioxane and stirred at 80° C. To this a warm solution (ca. 80° C.) of 10 ml. of 1 M aqueous potassium hydroxide is added. The reaction mixture is stirred at 80° C. for 30 minutes, then the heating bath is replaced by an ice bath. Dropwise addition of 2.5 M aqueous hydrochloric acid until the solution is acidic precipitates a solid. This is filtered, washed with water, dried and crystallized from benzene-petroleum benzin to give essentially pure 3,5-di-iodo-2-hydroxy - 4' - chloro-3'-(m-trifluoromethylphenoxy)-thiobenzanilide.

(I) 2-acetoxy-3,5-di-iodo-4'-chloro-3'-(m-trifluoromethylphenoxy)-thiobenzanilide A solution of 1.5 g. (2.2 mmole) of 3,5-di-iodo-2-hydroxy-4'-chloro - 3' - (m-trifluoromethylphenoxy)-thiobenzanilide in 25 ml. of anhydrous ether is cooled in an ice bath. To this solution 0.18 ml. (2.2 mmole) of pyridine followed by 0.16 ml. (2.2 mmole) of acetyl chloride is added. It is stirred at room temperature for 3 hours. Then the mixture is poured into ice water, acidified with a few drops of dilute hydrochloric acid and extracted with an ether-chloroform mixture. The organic phase is concentrated in vacuo to an oily residue, which is then crystallized from ethanol. Further recrystallization from the same solvent yields essentially pure 2-acetoxy-3,5-di-iodo-4'-chloro-3'-(m-trifluoromethylphenoxy)-thiobenzanilide.

The starting compounds for making the novel products of this invention are salicylanilides disclosed in U.S. patent application Ser. No. 634,442, filed Apr. 28, 1967, or other more simple organic compounds which are either known in the literature or may be prepared by methods readily apparent to those skilled in this art.

The salicylanilides of Formula II hereinabove are obtained by condensing an appropriately substituted salicylic acid chloride with an appropriately substituted amine:

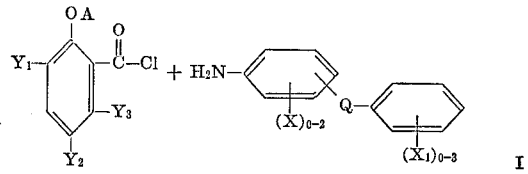

The reaction may be carried out by first forming the acid chloride of the substituted salicylic acid compound by refluxing the acid in a solvent such as benzene, toluene, or xylene with a halogenating agent such as thionyl chloride, oxalyl chloride, or phosphorous trichloride. The solvent is then removed before reacting the acid halide with the amine. Any suitable method may be employed, such as distillation in vacuo, particularly for the lower boiling solvents. The residue is then redissolved in the same solvent and the solution is added to a stirred mixture of the substituted aniline in an alkaline solution employing, for example, sodium hydroxide. The addition is generally carried out slowly to ensure the presence of excess alkali. After the addition of acid chloride is complete, the reaction mixture is generally stirred for an additional period of from 30–60 minutes to ensure complete reaction. The pH of the solution is then made neutral or barely acidic with a dilute acid such as hydrochloric acid, and the solid which separates is filtered off and purified by techniques known to those skilled in the art.

In order to maximize yields of Compounds I, it may be desirable in some cases to protect the phenol group to eliminate the possibility of interaction between the acid halide group of one molecule with the unprotected phenol group of another or with that of the product. This may be achieved by acylating before use, using preferably acetylation with, for example, acetic anhydride.

The amine reactant wherein Q is sulfur or oxygen and in which the phenoxy or phenylthio group is para to the amine nitrogen are prepared by condensation of an appropriately substituted p-halonitrobenzene with an appropriately substituted phenol or thiophenol. The resulting diphenyl ether or diphenylthio ether is reduced to convert the nitro group to an amino group.

Where the amine reactant has a phenoxy or phenylthio group meta to the amino group a p-halonitrobenzene is fused with the appropriately substituted phenol or thiophenol in a fusion reaction carried out by heating the reactants to their molten state, in the presence of a catalyst such as cuprous chloride, and in the presence of a base such as an alkali metal hydroxide. The resulting p-nitrophenoxy or phenylthio compound is then reduced to the corresponding amino compound catalytically and this latter material treated as described in Example 7 to obtain the meta-substituted amino reactant.

The following example is illustrative of the general procedure for obtaining the salicylanilide starting materials where the phenoxy or phenylthio ring is in the 4'-position. A general procedure for making those salicylanilides in which the phenoxy or phenylthio group is in the 3'-position is contained in Example 7. It will be understood by those skilled in this art that appropriate substituents should be present in the starting material when they are desired in the final products, (a) 2-chloro-4-nitrophenyl-p-chlorophenyl ether A mixture of 108 grams (0.842 mole) of p-chlorophenol and 58 grams of potassium hydroxide is stirred mechanically in a one-liter three-neck flask equipped with a thermometer until a homogeneous solution is obtained. During this time, about 10 minutes, the temperature is observed to rise to about 90° C. Then 90 grams of a 173 gram (0.901 mole) portion of 3,4-dichloronitrobenzene is added and the temperature raised carefully to ca. 120° C. An exothermic reaction begins which causes the temperature of the reaction mixture to increase to 150° C. The temperature is allowed to fall to 120° C. again and the remaining 83 grams of the dichloronitrobenzene added. The mixture is heated slowly to 130° C., the exothermic reaction again begins, and causes the temperature to increase to about 150° C. The reaction mass is cooled to 110° C., then 250 ml. of water is added quickly with vigorous stirring, to obtain a crystalline precipitate. The mixture is filtered, washed with water and the solid then dissolved in 800 ml. of boiling ethanol. The solution is boiled down until crystallization starts. The ether is obtained as yellow crystals, 142 grams, M.P. 105°–107° C. Upon recrystallization from boiling ethanol, 136 grams of 2-chloro-4-nitrophenyl-p-chlorophenyl ether, M.P. 106–108° C., are obtained.

(b) 4-amino-2-chlorophenyl-p-chlorophenyl ether

The 136 g. of 2-chloro-4-nitrophenyl-p-chlorophenyl ether obtained in step (a) is hydrogenated at room temperature at 40 lbs. hydrogen pressure in 800 ml. of ethanol with 4 teaspoons of Raney nickel until the theoretical amount of hydrogen is taken up (8 hours).

The catalyst is removed by filtration and the solvent is stripped off completely under high vacuo giving 132 grams of a brown oil which solidifies to a grey solid, M.P. 72°–74° C. This is used without further preparation for the next step.

(c) 3,5-dibromo-3'-chloro-4'-(p-chlorophenoxy)-salicylanilide 62.3 grams (0.245 mole) of 4-amino-2-chlorophenyl-p-chlorophenyl ether and 72.5 grams (0.245 mole) of 3,5-dibromo salicylic acid are suspended in 725 ml. of chlorobenzene and stirred mechanically. 8.6 ml. of phosphorus trichloride is added in a slow stream. The mixture is heated to boiling and refluxed for three hours, filtered hot, and concentrated in vacuo to ca. 450 ml. A thick slurry forms which is allowed to come to room temperature, aged 2 hours, filtered and washed with petroleum benzin. It is dried in vacuo at 50° C. for 24 hours, giving 98 grams of crude product, M.P. 163–165° C. On recrystallization from a mixture of benzene-petroleum benzin, 85 grams of 3,5-dibromo-3'-chloro-4'-(p-chlorophenoxy)-salicylanilide are obtained.

Where the aromatic rings of the substituted aniline compounds are joined by sulfur instead of oxygen, the above procedure for the preparation of the starting salicylanilides can also be employed.

It should be understood that although this invention has been described with reference to particular embodiments thereof, changes and modifications may be made which are within its intended scope, and it should be limited only by the language of the appended claim.

What is claimed is.

1. 3,5-di-iodo-2-hydroxy-4'-chloro-3'-(m-trifluoromethylphenoxy)-thiobenzanilide.

References Cited

FOREIGN PATENTS 6515918    6/1966    Netherlands _____ 260—559

OTHER REFERENCES

Weuffen et al.: Der Pharmazie, vol. 21, pp. 477–82 (1966).

HARRY I. MOATZ, Primary Examiner

U.S. Cl. X.R.

260—244 R, 454, 479 R, 571, 578; 424—311, 324